Feb. 16, 1971 H. P. A. SALAM 3,562,938
INFORMATION DISPLAY DEVICES
Filed Sept. 16, 1968 2 Sheets-Sheet 1

Hassan P.A. Salam
INVENTOR

BY
Lawrence C. Laubscher
ATTORNEY

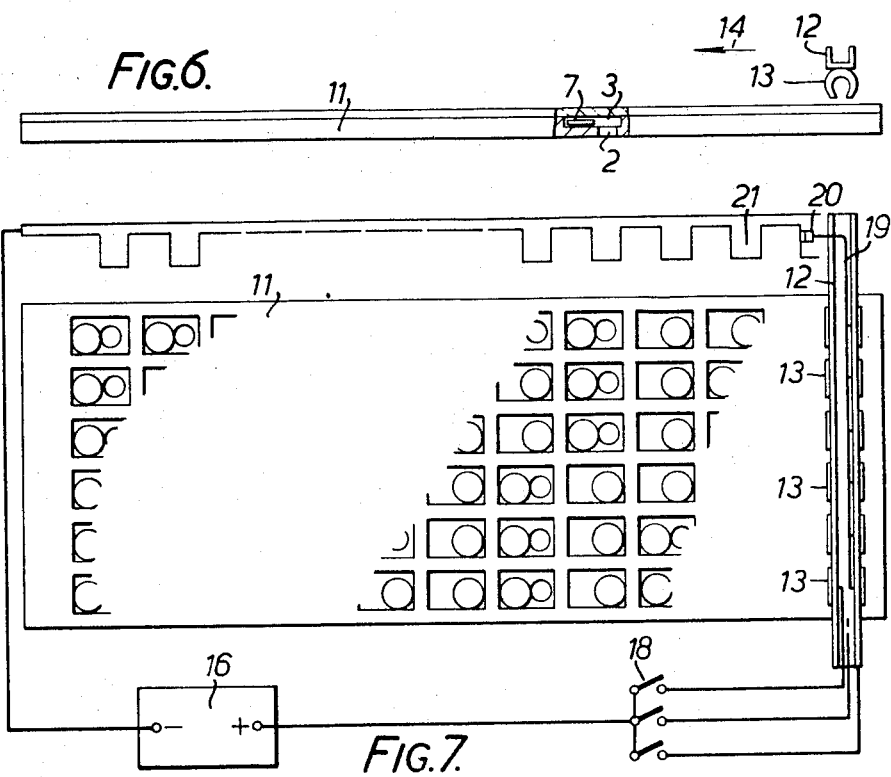
FIG.6.
FIG.7.
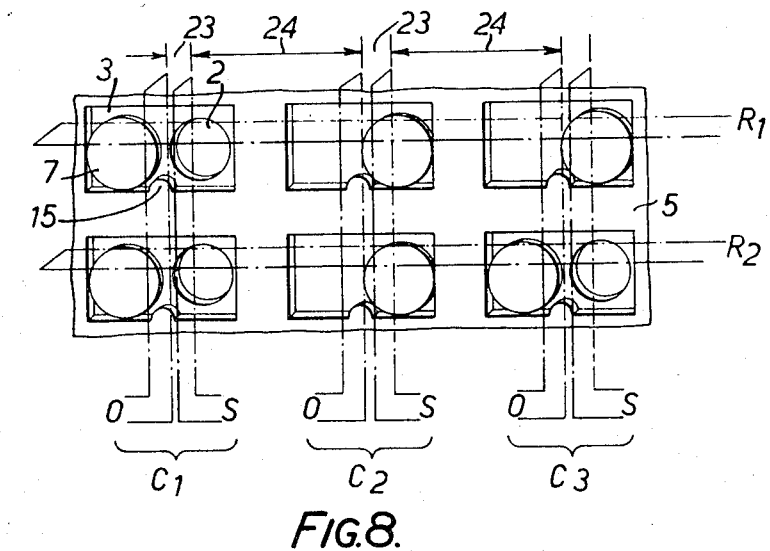
FIG.8.

United States Patent Office 3,562,938
Patented Feb. 16, 1971

3,562,938
INFORMATION DISPLAY DEVICES
Hassan Paddy Abdel Salam, London, England, assignor to Universal Telewriters (Pty.) Ltd., Durban, East Natal, Republic of South Africa, a company of South Africa
Filed Sept. 16, 1968, Ser. No. 762,195
Claims priority, application Great Britain, Sept. 27, 1967, 43,992/67
Int. Cl. G09f 11/00
U.S. Cl. 40—28                          9 Claims

ABSTRACT OF THE DISCLOSURE

Information display apparatus includes an opaque member with a matrix of transparent areas. An individual shutter associated with each aperture is movable between two stable positions in which it respectively exposes and occults that aperture. The shutter is moved by electrical means which applies directly to the shutter forces moving it from one to the other of the stable positions. These forces may be electrostatic or electromagnetic.

---

This invention relates to an information display device and is particularly concerned with a device by means of which information may be temporarily displayed and replaced by other information at arbitrary intervals.

It is an object of the present invention to provide information display apparatus wherein each of a matrix of transparent portions in an opaque member is individually obturated and unobturated by a shutter member.

It is a further object of the invention to provide information display apparatus wherein each of a plurality of shutter members movable to obturate or to expose individual ones of a matrix of transparent areas formed in an opaque member is moved by electromagnetic means.

Features and advantages of information display devices in accordance with the invention will become apparent from the following description, taken in conjunction with the drawings, comprising FIGS. 1 to 8, of which:

FIG. 6 is an inverted plan view of a display device together with an associated setting device;

FIG. 7 is an elevation of the apparatus shown in FIG. 6; and

FIG. 8 is a schematic diagram illustrating another embodiment of display device.

Figure 1:
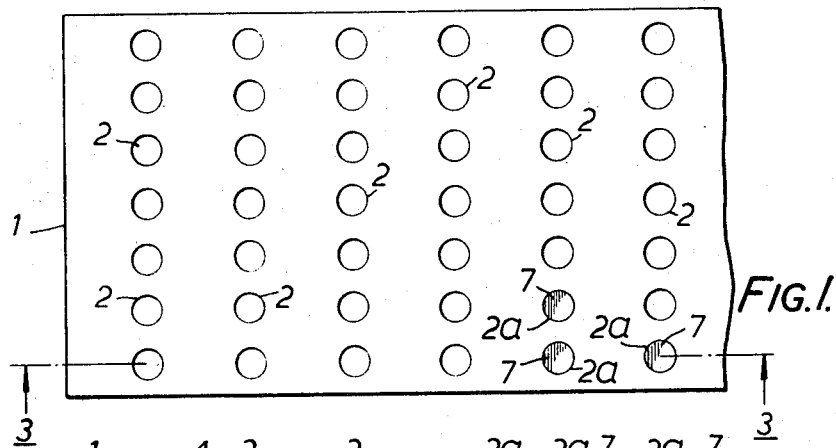
FIG. 1 is a front elevation of one embodiment of information display device.
Figure 2:
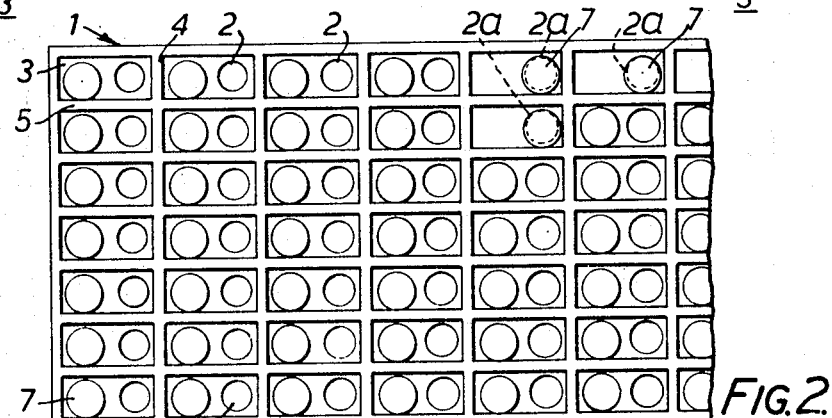
FIG. 2 is an inverted rear elevation of the device shown in FIG. 1.
Figure 3:
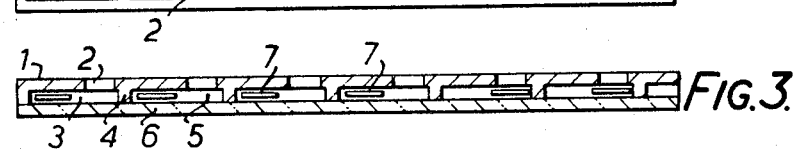
FIG. 3 is an inverted sectional plan view of the device shown in FIG. 1, taken along the line 3—3.

The information display device shown in FIGS. 1, 2 and 3 comprises an opaque member 1 pierced by an array of equi-spaced apertures 2. Each of the apertures enters an individual cell 3 formed by vertical and horizontal ribs 4, 5 protruding from the rear surface of member 1, as seen in FIGS. 2 and 3. Cells 3 are closed by a transparent member 6 which is preferably secured by an adhesive to the outer surfaces of ribs 4, 5. Within each cell 3 is disposed a shutter disc 7 which is free to move within the cell by rolling on the floor thereof between a position in which it leaves the aperture 2 entering that cell unobstructed and another position in which the aperture is wholly occulted. Thus by appropriate positioning of the shutter discs the appearance of the display device may be changed in such a manner as to display the required information.

The device is preferably, though not essentially, viewed by transmitted light and an image of the device may be projected upon a viewing screen by conventional optical means (not shown).

Conveniently, shutter discs 7 are formed of ferromagnetic material and their adjustment from one position to another within their respective cells may then be effected as described below in relation to FIGS. 6 and 7. It is however possible for the discs to be made of electrically conductive material, in which case they may be adjusted by interaction between eddy currents induced therein and an associated alternating magnetic field, or by electrostatic means.

Figure 4:
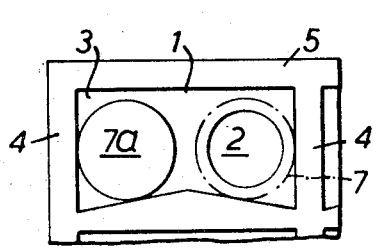
FIG. 4 is a scrap elevation to an enlarged scale of a part of a modified embodiment.

FIG. 4 shows a single cell formed by vertical and horizontal ribs 4, 5 of an alternative embodiment of display device. Here again an aperture 2 may be exposed or occulted by a shutter disc 7. The surface of rib 5 which forms the lower boundary of the cell is, however, ramped upwardly from each end, so that provided that the device is disposed with its general plane vertical the disc will be retained by gravity in one or other of its desired operative and inoperative positions, 7, 7a.

Figure 5:
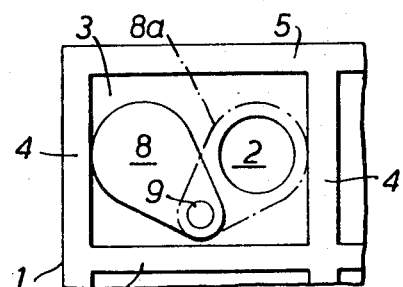
FIG. 5 is a scrap elevation to an enlarged scale of a part of another modified embodiment.

FIG. 5 shows a single cell of another alternative embodiment of the invention in which the free-moving shutter disc 7 of the embodiments previously described is replaced by a shutter blade 8 pivoted at 9 to a pin formed integrally with or inserted in member 1. Shutter blade 8 thus pivots between the inoperative position 8 and the operative position 8a shown in broken line in which it occults aperture 2.

FIGS. 6 and 7 show a means for producing the required adjustment of the shutter members. A display member 11 as described in relation to the preceding figures is associated with a channel-section member 12 guided by suitable conventional means (not shown) for movement parallel to its initial position along the length of the display assembly. Aligned with each horizontal row of display cells is an individual electromagnet 13. The method by which this device is used to adjust the display of information is as follows. Initially, the magnet array is traversed across the display in the direction of arrow 14, all the magnets being energized. Thus, the ferromagnetic shutter disc 7 contained in each cell 3 (of which one alone is shown in FIG. 6), will be drawn by the travelling magnet associated with that row of cells into the inoperative position to expose the aperture 2 which enters that cell. The direction of travel of the magnet array is then reversed and the magnets are selectively energized at times when they are positioned opposite the apertures in each column of cells so as to attract shutter discs to cover those apertures which are to be occulted.

Obviously the mode of operation may be the reverse of that described above, the shutter discs being initially moved to occult all apertures and selectively displaced on the return movement of the magnet array to expose selected apertures only.

To ensure correct correlation between the relative positions of the display matrix and the controlling magnets and the energisation of the magnets, the arrangement shown in FIG. 7, or an analogous system, may be adopted. In FIG. 7 electric current from a direct-current source 16 is led by way of a conductor 17 to a set 18 of electric switches of which in practice there will be one for each of electromagnets 13, though three only are shown. When any one of switches 18 is closed current may flow from source 16 to the selected magnet 13 and thence by way of a conductor 19 common to all the magnets to a contact brush 20 which is mounted on magnet support 12. Brush 20 co-operates with a digitate conductor 21 of which the digital projections each correspond with the position of one of the shutter cells in the matrix and has half the length of the cell. In this manner a selected magnet will be energized only during that period when the magnet is positioned over a selected end of each shutter cell so that the shutter must move to the desired position. It is of course necessary to ensure that switch 18 for a particular one of magnets 13 is operated only when the magnet is positioned generally adjacent the cells containing the shutters which are required to be actuated. Suitable means for producing the required switch operation will be apparent to those skilled in the art and will not be further described. To restore all shutters to a common position preparatory to changing the displayed information, current may be fed to all the electromagnets simultaneously by suitable conventional means while the magnets are traversed over the matrix.

Although in the apparatus described above the magnets are stated to be moved in relation to the shutter cell matrix, it will be apparent that the magnets may remain stationary and the matrix itself may be caused to move.

An alternative means for producing the required displacement of the shutter members is shown schematically in FIG. 8. Here there is indicated a display device comprising a two-dimensional array of cells such as 3, each containing a shutter disc 7 which in this case may be made either of magnetic material or of highly electrically conductive material, such as copper or aluminium. The rib 5 bounding each cell is provided on its upper surface with an inwardly directed protuberance 15 which prevents inadvertent movement of a shutter disc from one position to the other.

Associated with each column of discs are two energizing conductors $C_1O$, $C_1S$, $C_2O$, $C_2S$ and so on. In addition, each row of cells has an associated conductor R1, R2 and so on. Energization of a row conductor and of one of the two conductors associated with a column will cause the shutter member of the cell at the intersection of the selected row and column to attain the selected position, the "open" position in which the aperture is open when the "O" conductor for a column is selected and the "closed" position in which the aperture is occulted when the "S" conductor for the column is selected. The magnitude of the current applied to each conductor is such that only the field produced when both a row and a column conductor are energised is sufficient to produce movement of the shutter member.

The spacing 23 between the pair of conductors associated with each column of shutter cells is made substantially less than the spacing 24 between conductors associated with adjacent columns in order to prevent undesired interaction.

The action of disc movement is as follows: the action of the magnetic field produced by a row conductor will tend to raise the disc and a similar interaction between the disc field and that of the energized column conductor will produce the desired lateral displacement of the disc.

It will be appreciated that when the disc is formed of magnetic material the forces on it will be produced by the magnetic fields of the D-C energized conductors, when the disc is of conductive material the force results from the interaction between the magnetic field due to eddy currents induced in the disc and the field due to the A-C energised conductor. Thus when the disc is of magnetic material it will be arranged to be lifted by the field produced by a row conductor, which will then be at a higher level than the disc, while when the disc is conductive it will be raised by the repulsive effect of an A-C energised row conductor, which will then be at a lower level. A similar action occurs with regard to the column conductors, a magnetic disc being attracted towards a D-C energised conductor and a conductive disc repelled from an A-C energised conductor.

I claim:

1. Information display apparatus comprising, in combination,
   a two-dimensional array of individual cells, each said cell including an opaque member having therein a transparent area;
   a planar shutter member in each said cell;
   means mounting said shutter member for selective coplanar movement between a first stable position in which it obturates said transparent area and a second stable position in which said transparent area is exposed; and
   current-responsive electromagnetic means operable to induce directly in said shutter member a force moving said member between said positions.

2. Apparatus as claimed in claim 1, characterized by each said shutter member being a disc loosely mounted within a respective one of said cells for rolling movement between said positions.

3. Apparatus as claimed in claim 2 characterised by a boundary of said cell constituting a floor contacted at spaced points thereof by said disc in said first and second positions and by said floor having a raised portion intermediate said positions.

4. Apparatus as claimed in claim 1 characterised by means mounting said shutter member for pivotal movement in its own plane between said first and second positions.

5. Apparatus as claimed in claim 1 characterised in that said shutter member is formed of ferromagnetic material and in that said electromagnetic means is constituted by a common system of conductors arranged to produce selectively a first magnetic field attracting said shutter member into said first position and a second magnetic field attracting said shutter member into said second position.

6. Apparatus as claimed in claim 1 characterised in that said shutter member is formed of electrically conductive material and in that said electromagnetic means is constituted by a system of conductors arranged when energised by alternating current to produce eddy currents in said shutter member and to produce also a magnetic field with which said eddy currents interact to induce said force in said shutter member.

7. Apparatus as claimed in claim 1, characterised in that said electromagnetic means is constituted by a first and a second array of conductors, the conductors in each said array being mutually parallel and being perpendicular to conductors of the other array, said first array of conductors comprising pairs of conductors each extending along an aligned set of said shutter members in said matrix and said second array of conductors each extending across an aligned set of said shutter members, whereby the passage of electric current through a conductor of each of said first and second arrays induces a force upon a selected one of said shutter members.

8. Apparatus in accordance with claim 1 characterised in that said electromagnetic means comprises a set of electromagnets, means mounting said magnets on a support member, means for supplying said magnets selectively with electric curernt and means producing relative movement between said support member and said shutter matrix.

9. Apparatus in accordance with claim 8 wherein said support member is fixed and said matrix is movable.

References Cited

UNITED STATES PATENTS

| 1,191,023 | 7/1916 | Naylor | 40—28C |
| 3,096,594 | 7/1963 | Skrobisch | 40—28C |
| 3,283,427 | 11/1966 | Winrow | 40—28C |
| 3,186,115 | 6/1965 | Todt | 40—28C |

FOREIGN PATENTS

| 24,108 | 10/1913 | Great Britain | 40—28C |

JEROME SCHNALL, Primary Examiner

W. J. CONTRERAS, Assistant Examiner

U.S. Cl. X.R.

40—52, 61